United States Patent
Tazawa et al.

(10) Patent No.: US 9,065,380 B2
(45) Date of Patent: Jun. 23, 2015

(54) METHOD FOR CALCULATING MOTOR CONSTANT OF PERMANENT MAGNET TYPE SYNCHRONOUS MOTOR AND MOTOR CONSTANT CALCULATING DEVICE

(75) Inventors: Toru Tazawa, Osaka (JP); Masaru Nishizono, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 39 days.

(21) Appl. No.: 14/232,731

(22) PCT Filed: Jul. 30, 2012

(86) PCT No.: PCT/JP2012/004822
§ 371 (c)(1),
(2), (4) Date: Jan. 14, 2014

(87) PCT Pub. No.: WO2013/018349
PCT Pub. Date: Feb. 7, 2013

(65) Prior Publication Data
US 2014/0152202 A1 Jun. 5, 2014

(30) Foreign Application Priority Data
Aug. 3, 2011 (JP) .................... 2011-169841

(51) Int. Cl.
*H02P 6/00* (2006.01)
*H02P 23/14* (2006.01)
*H02P 6/18* (2006.01)

(52) U.S. Cl.
CPC .............. *H02P 23/14* (2013.01); *H02P 6/183* (2013.01)

(58) Field of Classification Search
CPC ... H02P 25/021; H02P 23/0081; H02P 21/14; H02P 23/14; H02P 21/0003; H02P 21/145; H02P 2207/05; H02P 2203/09
USPC ............... 318/400.01, 400.13, 400.14, 400.2, 318/717, 722, 437, 438, 455, 490, 504
See application file for complete search history.

(56) References Cited

U.S. PATENT DOCUMENTS 5,218,277 A * 6/1993 Pattison et al. ............... 318/135
7,852,022 B2 * 12/2010 Kono et al. ................... 318/135
(Continued)

FOREIGN PATENT DOCUMENTS

| JP | 6-34724 A | 2/1994 |
| JP | 10-225200 A | 8/1998 |
| JP | 2000-312498 A | 11/2000 |
| JP | 2004-72821 A | 3/2004 |

(Continued)

OTHER PUBLICATIONS

International Search Report for PCT/JP2012/004822, Oct. 23, 2012, Panasonic Corporation.

*Primary Examiner* — Bentsu Ro
*Assistant Examiner* — Thai Dinh
(74) *Attorney, Agent, or Firm* — RatnerPrestia (57) ABSTRACT

A method for calculating a motor constant of a permanent magnet type synchronous motor according to the present invention includes: a voltage applying step of applying a voltage obtained by compositing a DC component and an AC component to a permanent magnet type synchronous motor while varying a frequency of the AC component; a current detecting step of detecting a motor current flowing according to the applied voltage; a phase difference calculating step of calculating a difference in phase between the AC component of the applied voltage and an AC component of the motor current; and a motor constant calculating step of calculating a motor constant of the permanent magnet type synchronous motor. In addition, in the motor constant calculating step, the motor constant is calculated based on the applied voltage and the motor current when the difference in phase becomes nearly 45 degrees.

8 Claims, 7 Drawing Sheets

(56) References Cited

U.S. PATENT DOCUMENTS

| | | | |
|---|---|---|---|
| 8,319,459 B2* | 11/2012 | Ichiki et al. | 318/400.02 |
| 2002/0113615 A1* | 8/2002 | Atarashi | 324/772 |
| 2008/0018284 A1* | 1/2008 | Kinpara et al. | 318/490 |

FOREIGN PATENT DOCUMENTS

| | | |
|---|---|---|
| JP | 2006-174524 A | 6/2006 |
| JP | 2009-232573 A | 10/2009 |
| JP | 2011-193563 A | 9/2011 |

* cited by examiner

METHOD FOR CALCULATING MOTOR CONSTANT OF PERMANENT MAGNET TYPE SYNCHRONOUS MOTOR AND MOTOR CONSTANT CALCULATING DEVICE

This application is a U.S. National Phase Application of PCT International Application PCT/JP2012/004822.

TECHNICAL FIELD

The present invention relates to a method for calculating motor constant of a permanent magnet type synchronous motor and a motor constant calculating device therefor.

BACKGROUND ART

It is important to grasp a motor constant such as an armature resistance or an inductance so as to control a permanent magnet type synchronous motor with high accuracy. Under, for example, a position sensorless control in which the above-described motor is controlled without a magnetic pole position sensor, a technique for estimating a magnetic pole position with a motor constant is adopted in many cases. Alternatively, a current is controlled in most motors under a vector control, wherein a motor constant is used to properly set a gain in a current controller.

In order to readily obtain a motor constant in the above-described motor, there has been known some techniques for obtaining the motor constant without rotating the motor. Patent Literature 1, for example, has been known. In the technique disclosed in Patent Literature 1, a DC current is allowed to flow, and then, a coil wire resistance is obtained based on an input voltage and an input current at that time. At the same time, fundamental wave components of an input voltage and an input current when an AC current is allowed to flow are extracted, and thereafter, an inductance is obtained based on the value of each of the voltage and the current and a difference in phase therebetween.

Moreover, Patent Literature 2 has been known as another technique. In this technique, first, a voltage is stored when DC currents on a higher level and a lower level are allowed to flow. A difference in voltage between the two levels is divided by a difference in current between the two levels, thereby calculating a coil wire resistance. At the same time, the voltage is sharply changed from a voltage value based on the higher current level to a voltage value based on the lower current level. A period of time until the current at the time of the sharp change is changed to a predetermined value is measured, so that an inductance is calculated based on the resultant period of time and the coil wire resistance.

However, the technique disclosed in Patent Literature 1 requires a time until the DC current becomes constant. Additionally, since different test signals are used for measuring the resistance and the inductance, a time is required for the measurement. In addition, unless the frequency of the AC current which is allowed to flow for obtaining the inductance is properly set, the detection accuracy of the difference in phase is degraded, resulting in a large error in a measurement result.

The technique disclosed in Patent Literature 2 also requires a time until the DC current is allowed to flow to become constant. Additionally, since different test signals are used for measuring the resistance and the inductance, a time is required for the measurement. Furthermore, in the case of measurement of a period of time until the current is changed to a predetermined value after the sharp change of the voltage value, level judgment or time measurement is liable to be erroneous. Moreover, in the case of a motor whose inductance value is changed according to the current value, a response having a predetermined time constant cannot be obtained, and therefore, an inductance value cannot be correctly calculated.

CITATION LIST

Patent Literature

PTL 1: Unexamined Japanese Patent Publication No. 2000-312498
PTL 2: Unexamined Japanese Patent Publication No. 2009-232573

SUMMARY OF THE INVENTION

A method for calculating a motor constant of a permanent magnet type synchronous motor according to the present invention includes: a voltage applying step of applying a voltage obtained by compositing a DC component and an AC component to the motor while varying a frequency of the AC component; a current detecting step of detecting a motor current flowing according to the applied voltage; a phase difference calculating step of calculating a difference in phase between the AC component of the applied voltage and an AC component of the motor current; and a motor constant calculating step of calculating a motor constant of the motor. In addition, in the motor constant calculating step, the motor constant is calculated based on the applied voltage and the motor current when the difference in phase becomes nearly 45 degrees. Moreover, a plurality of different DC components may be further used in the voltage applying step.

Additionally, a motor constant calculating device according to the present invention includes functions of carrying out the steps in the method for calculating a motor constant.

With the above-described configuration, the motor constant of the permanent magnet type synchronous motor can be accurately calculated in a short period of time.

DESCRIPTION OF EMBODIMENTS

Exemplary embodiments according to the present invention will be described below with reference to the attached drawings. Here, these exemplary embodiments do not limit the present invention.

First Exemplary Embodiment

Figure 1:
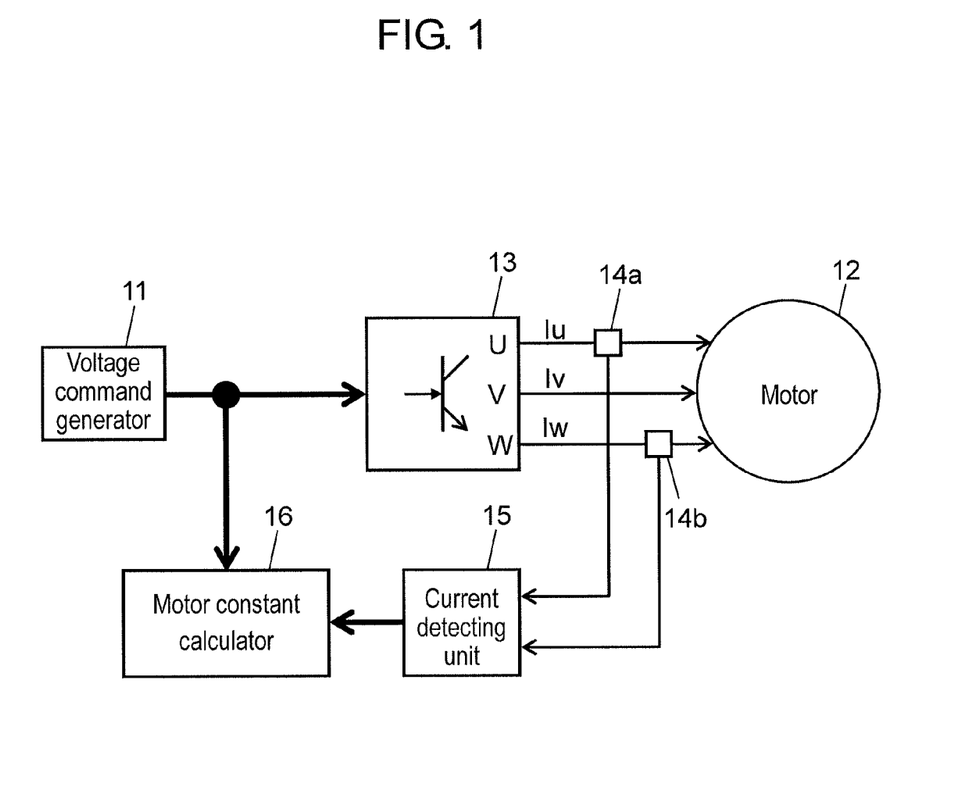
FIG. 1 is a block diagram illustrating a configuration of a first exemplary embodiment according to the present invention.

FIG. 1 is a block diagram illustrating a configuration example for carrying out a method for calculating a motor constant in a first exemplary embodiment according to the present invention. This block diagram illustrates only functional parts required for calculating a motor constant. Specifically, FIG. 1 illustrates one example in which there are provided a voltage command generator 11, an inverter 13, a current detectors 14a and 14b, a current detecting unit 15, and a motor constant calculator 16 in order to calculate the motor constant of a permanent magnet type synchronous motor (hereinafter simply referred to as motor) 12 exemplifying a motor of a permanent magnet type synchronous system.

Explanation will be made on the function of each of functional blocks illustrated in FIG. 1 and the relationship between the functional blocks.

First of all, the motor 12 includes a permanent magnet, not illustrated, and a coil wire, not illustrated, wound around an iron core or the like. When an AD power is applied to the coil wire from the inverter 13 during a normal operation of the motor, a rotor is rotationally operated. FIG. 1 illustrates the constitutional example in which the motor 12 is driven by an AC power of three phases such as a U phase, a V phase, and a W phase.

The voltage command generator 11 is adapted to produce a voltage command to be applied to the motor 12 in order to calculate a motor constant. The inverter 13 is designed to receive the voltage command to be output from the voltage command generator 11 so as to apply a voltage as commanded to the motor 12. The current detectors 14a and 14b are adapted to detect a motor current flowing in the motor 12 from the inverter 13. The current detecting unit 15 is designed to convert the motor current detected by the current detector 14a or 14b into a motor current detection value. The motor constant calculator 16 is adapted to receive the voltage command as an output from the voltage command generator 11 and the motor current detection value as an output from the current detecting unit 15 so as to calculate the motor constant of the motor 12.

Figure 2:
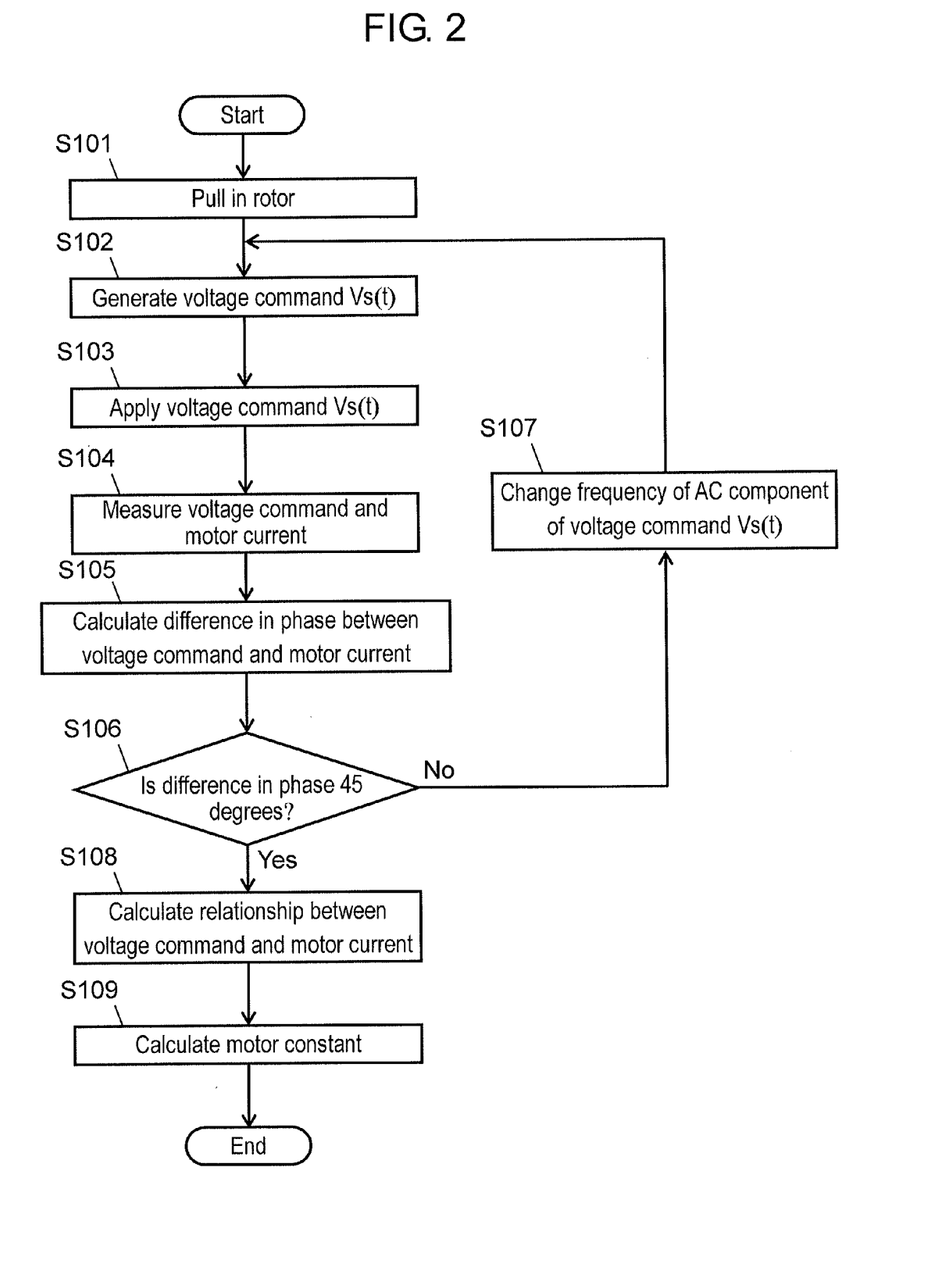
FIG. 2 is a flowchart illustrating a processing flow in the first exemplary embodiment according to the present invention.

Next, the operation and function of each of the functional blocks will be described with reference to FIGS. 2 to 5. FIG. 2 is a flowchart illustrating the processing flow of the method for calculating a motor constant in the first exemplary embodiment according to the present invention.

Figure 3:
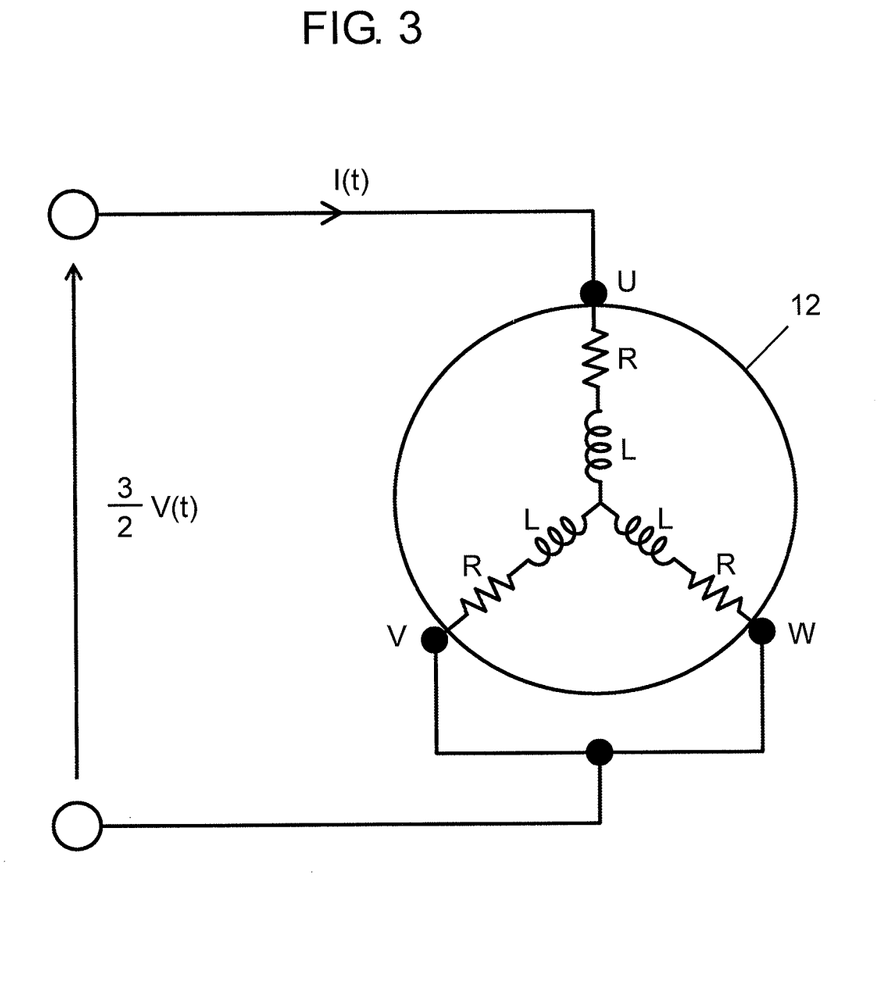
FIG. 3 is an equivalent circuit diagram explanatory of a single phase energization state.

Upon the start of motor constant calculating processing, first, the inverter 13 applies a DC voltage to the motor 12, thereby pulling in the rotor. Since the rotor includes a magnet in the permanent magnet type synchronous motor, the rotor may be rotated with the application of a voltage. In the present exemplary embodiment, a motor constant is calculated in the state in which the rotor is stationary, so that the DC voltage is first applied by the inverter 13, thus pulling in the rotor to a predetermined position (step S101). For example, DC voltage Va is applied to a U phase, and further, DC voltage −Va/2 is applied to a V phase and a W phase. FIG. 3 illustrates an equivalent circuit of the motor 12 after the rotor is pulled in. As illustrated in FIG. 3, coil wires in the U phase, the V phase, and the W phase in the motor 12 have the interrelationship of a Y connection. Since the rotor is not rotated, each of the coil wires consists of a phase resistance R and a phase inductance L. This signifies application of a voltage of a single phase to between the phase U and the phases V and W. At this time, a current axis (i.e., a d axis) and a magnetic pole axis accord with each other.

Next, the voltage command generator 11 generates a voltage command to be applied to the motor 12 in order to calculate a motor constant. Specifically, as expressed by Equation 1 below, DC component V0 and AC component Vn(t) are composited with each other, thus producing a voltage command Vs(t) obtained by adding both of the components (step S102). A sinusoidal signal is used as AC component Vn(t).

Equation 1

$$Vs(t) = V0 - Vn(t) \qquad \text{(Equation 1)}$$

Subsequently, a voltage of a single phase is applied to between U and V W based on the voltage command Vs(t) generated by the voltage command generator 11 in the same manner as during the pulling-in processing. For example, voltage Vs(t) is applied to the U phase, and further, voltage −Vs(t)/2 is applied to the V phase and the W phase, as applying an applied voltage (step S103). In this manner, a current flowing in response to the voltage command Vs(t) eventually flows in the same d axis as the magnetic pole axis, so that no torque for rotating the rotor is generated. In other words, data can be measured for calculating a motor constant in the state in which the rotor is stationary.

The current detectors 14a and 14b and the current detecting unit 15 detect a motor current Is(t) flowing at the time of the application of the voltage in step S103.

Subsequently, the applied voltage Vs(t) as the voltage command and the motor current Is(t) as a response at that time are measured (step S104). The motor current Is(t) is a motor current with respect to the single phase voltage application, and therefore, a U phase current is measured.

Figure 4:
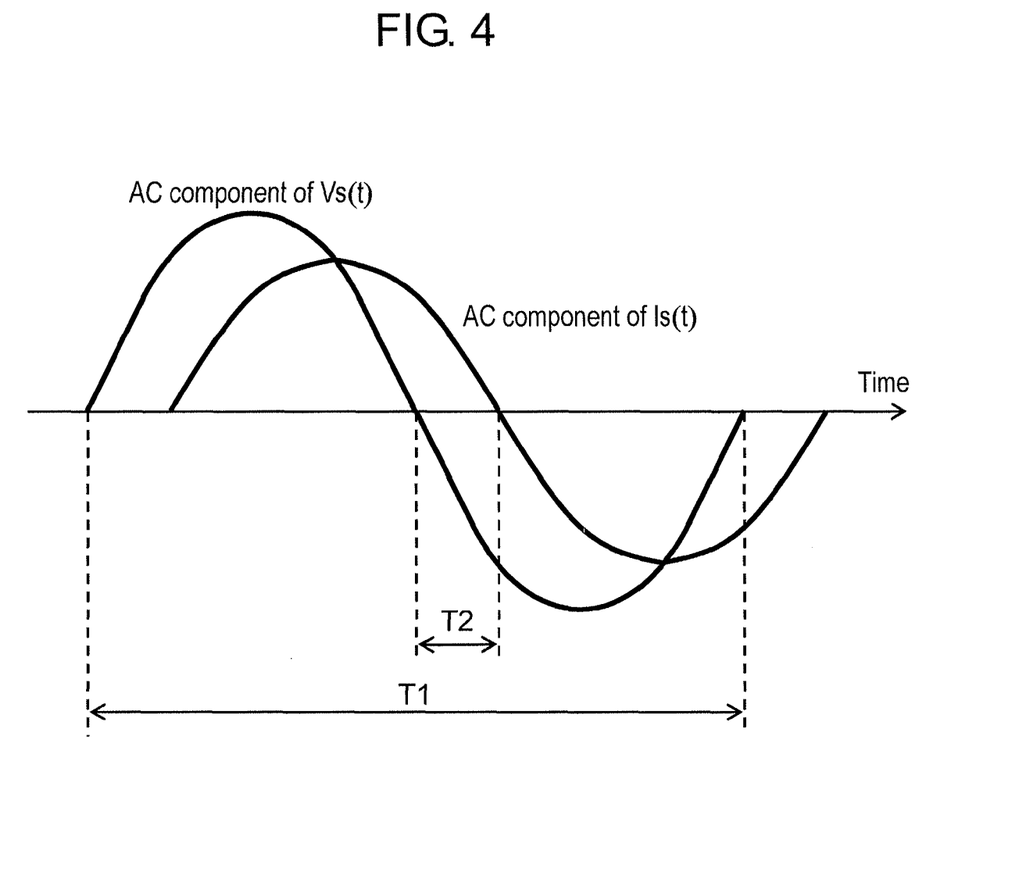
FIG. 4 is a time waveform chart explanatory of a difference in phase between a voltage and a current.

Next, a difference in phase between the AC component of the applied voltage Vs(t) and an AC component of the motor current Is(t) is calculated (step S105). For example, each of the applied voltage Vs(t) and the motor current Is(t) is allowed to pass a band-pass filter having a frequency of the AC component Vn(t) as a center frequency, so as to extract an AC component, thus calculating the difference in phase based on a time difference in zero cross timing. This will be described with reference to FIG. 4. FIG. 4 illustrates time axis data on the extracted AC components of the applied voltage Vs(t) and the motor current Is(t), thus acquiring a time difference T2 between the zero cross timings of AC components of the applied voltage Vs(t) and the motor current Is(t). From the time difference T2 and a cycle T1 of the AC component, a difference $\theta_{diff}$ in phase can be calculated according to Equation 2, as follows:

Equation 2

$$\theta_{diff} = 360 \times (T2/T1) \qquad \text{(Equation 2)}$$

Subsequently, it is determined whether or not the difference $\theta_{diff}$ in phase is 45 degrees (step S106). Unless the difference $\theta_{diff}$ in phase is 45 degrees, the frequency of the AC component Vn(t) of the voltage command Vs(t) is changed (step S107), and then, the processing after step S102 is repeated. For example for varying the frequency, the frequency is gradually decreased from a high frequency, and then, is changed. As described later, the difference in phase is uniquely determined because it has monotonically increasing characteristics with respect to the frequency. In contrast, if the difference $\theta_{diff}$ in phase is 45 degrees, the relationship between the applied voltage Vs(t) and the motor current Is(t) at that time is calculated (step S108). Specifically, an amplitude ratio |Is(t)/Vs(t)| representing the value of the current Is(t) with respect to the applied voltage Vs(t) is calculated.

Finally, a motor constant is calculated with using the amplitude ratio which is representing the relationship between the applied voltage Vs(t) and the motor current Is(t) (step S109).

Here, explanation will be made on calculation of a motor constant based on the applied voltage and the motor current when the difference in phase becomes 45 degrees.

When the voltage Vs(t) is applied, an equivalent circuit of a coil wire of the motor 12 is as illustrated in FIG. 3, and therefore, a transmission function is expressed by the following Equation 3.

Equation 3

$$\frac{Is}{Vs} = \frac{(1/R)}{(L/R)s + 1} \quad \text{(Equation 3)}$$

Figure 5:
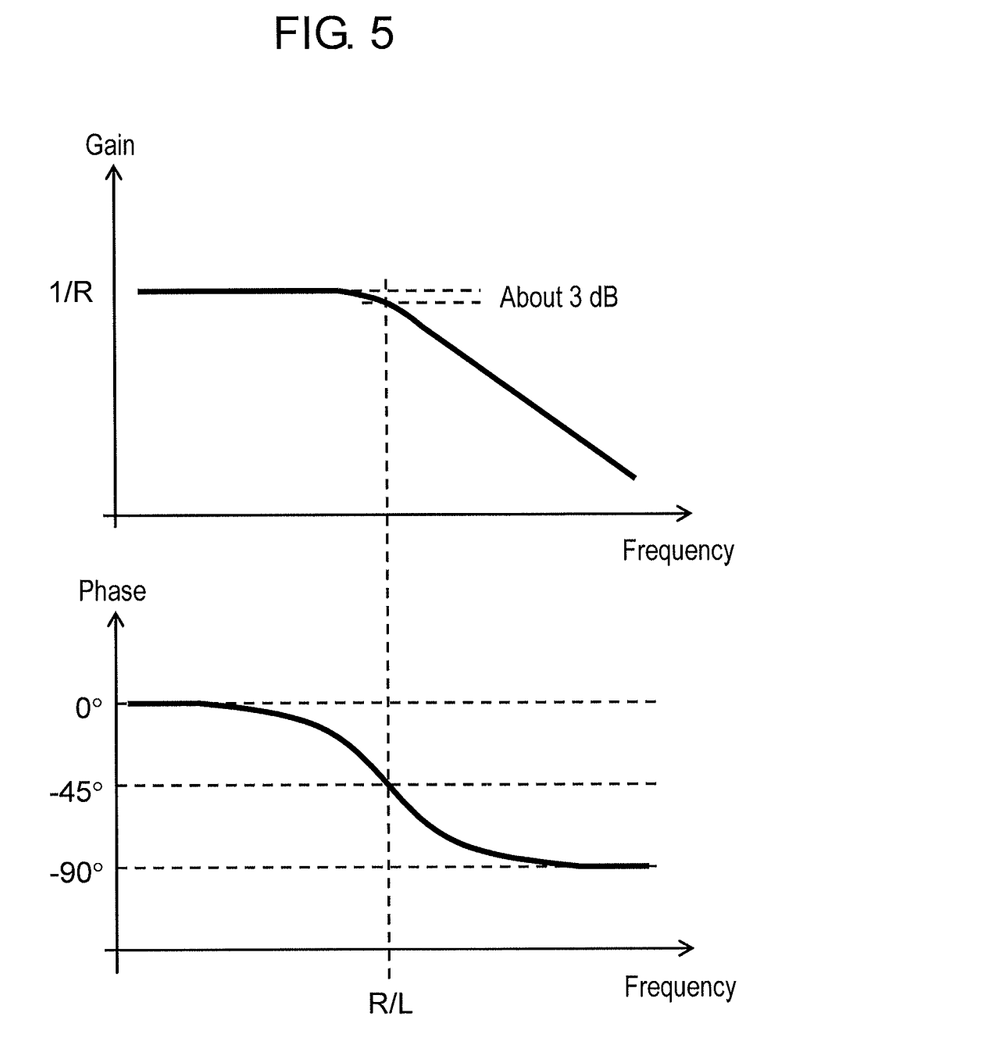
FIG. 5 is a graph illustrating frequency characteristics of a transmission function of a permanent magnet type synchronous motor.

This expresses primary delay characteristics in which a cut-off frequency becomes R/L and a DC gain becomes 1/R. FIG. 5 illustrates frequency characteristics of the transmission function expressed by Equation 3. In FIG. 5, an upper graph illustrates gain characteristics with respect to the frequency whereas a lower graph illustrates phase characteristics with respect to the frequency. As illustrated in FIG. 5, the phase characteristics have monotonically decreasing characteristics with respect to the frequency. Moreover, the cut-off frequency is obtained when the difference in phase becomes 45 degrees, and therefore, R/L can be obtained from the frequency having a difference in phase of 45 degrees obtained in step S106. Moreover, a gain at the cut-off frequency having the primary delay characteristics is lower by about 3 dB than the DC gain. The vertical axis of the gain characteristics in FIG. 5 is equivalent to the amplitude ratio, and therefore, a DC gain 1/R is obtained by adding 3 dB to a value of the amplitude ratio obtained in step S108. An electric time constant L/R, a resistance R, and an inductance L are calculated based on resultant R/L and 1/R. At this time, inductance to be measured becomes a d axis inductance.

Incidentally, although the motor constant is calculated by the use of the values of the voltage command and the motor current when the difference in phase becomes 45 degrees in the present exemplary embodiment, values of a voltage command and a motor current when the difference in phase becomes nearly 45 degrees may be used. Specifically, as illustrated in FIG. 5, a change in phase is the sharpest at a point where the difference in phase becomes 45 degrees. Consequently, the frequency obtained in step S106 is not largely changed in the vicinity of 45 degrees, and therefore, satisfactory calculation accuracy can be achieved.

As described above, the method for calculating a motor constant in the present exemplary embodiment includes: the step of applying the applied voltage obtained by combining the DC component and the AC component to the permanent magnet type synchronous motor while varying the frequency of the AC component; the step of detecting the motor current flowing according to the applied voltage; the step of calculating the difference in phase between the AC component of the applied voltage and the AC component of the motor current; and the step of calculating the motor constant of the permanent magnet type synchronous motor based on the applied voltage and the motor current when the difference in phase becomes substantially 45 degrees.

The present method for calculating a motor constant is such configured as described above. As a consequence, the voltage obtained by compositing the DC component and the AC component having the changed frequency is applied, and then, the motor current at that time is just detected, thus calculating the motor constant. As a consequence, time can be remarkably shortened in comparison with the conventional technique for waiting until the motor current becomes constant or applying a plurality of test signals. Moreover, since the motor constant is calculated with the AC components of the applied voltage and the motor current, the motor constant can be accurately calculated without any influence by a noise. Additionally, as illustrated in FIG. 5, since the change in phase is the sharpest at the point where the difference in phase is 45 degrees, it is possible to specify the frequency with high accuracy, resulting in calculating the motor constant with high accuracy. In addition, since the motor constant can be calculated by the use of only the data on the voltage amplitude and the current amplitude and the frequency at the point where the difference in phase between the applied voltage and the motor current becomes 45 degrees, a data storage capacity can be reduced.

Second Exemplary Embodiment

In some motors, an inductance value depends upon a value of a motor current by an influence of magnetic saturation or the like. Only one value can be calculated by the calculating method described in the first exemplary embodiment with respect to such motors, and therefore, the accurate inductance value cannot be calculated.

In the present exemplary embodiment, a plurality of different DC components is used in the step of applying a voltage to a permanent magnet type synchronous motor, so that an inductance value according to a motor current is accurately calculated. Specifically, the frequency of an AC component in an applied voltage is varied, and further, a voltage of a DC component also is varied in calculating a motor constant in the present exemplary embodiment.

The operation and function of a method for calculating a motor constant in the present exemplary embodiment will be described below with reference FIGS. 6 and 7. Here, the configuration of the second exemplary embodiment is the same as that of the first exemplary embodiment, and therefore, their explanation will be omitted below.

Figure 6:
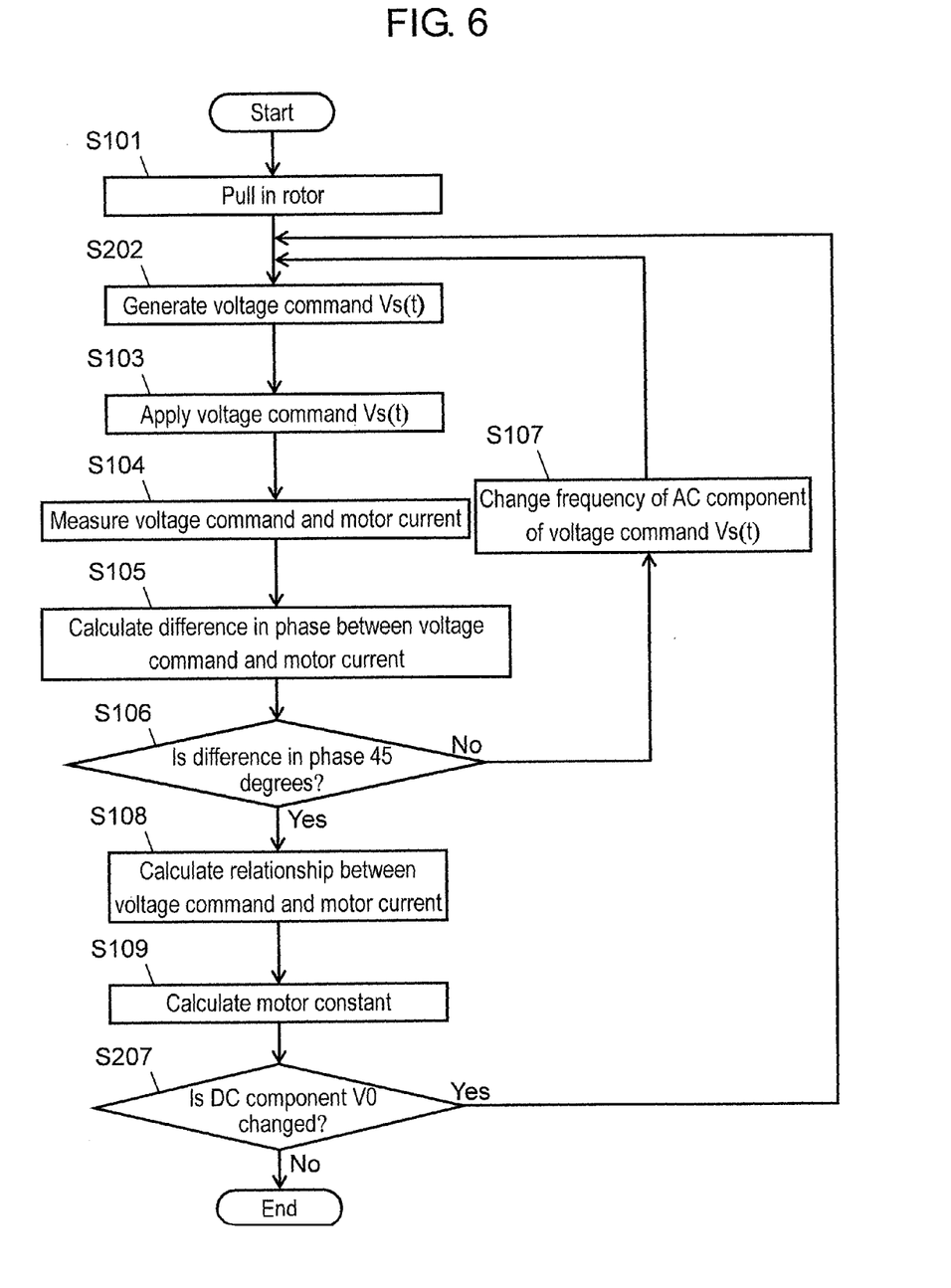
FIG. 6 is a flowchart illustrating a processing flow in a second exemplary embodiment according to the present invention.
Figure 7:
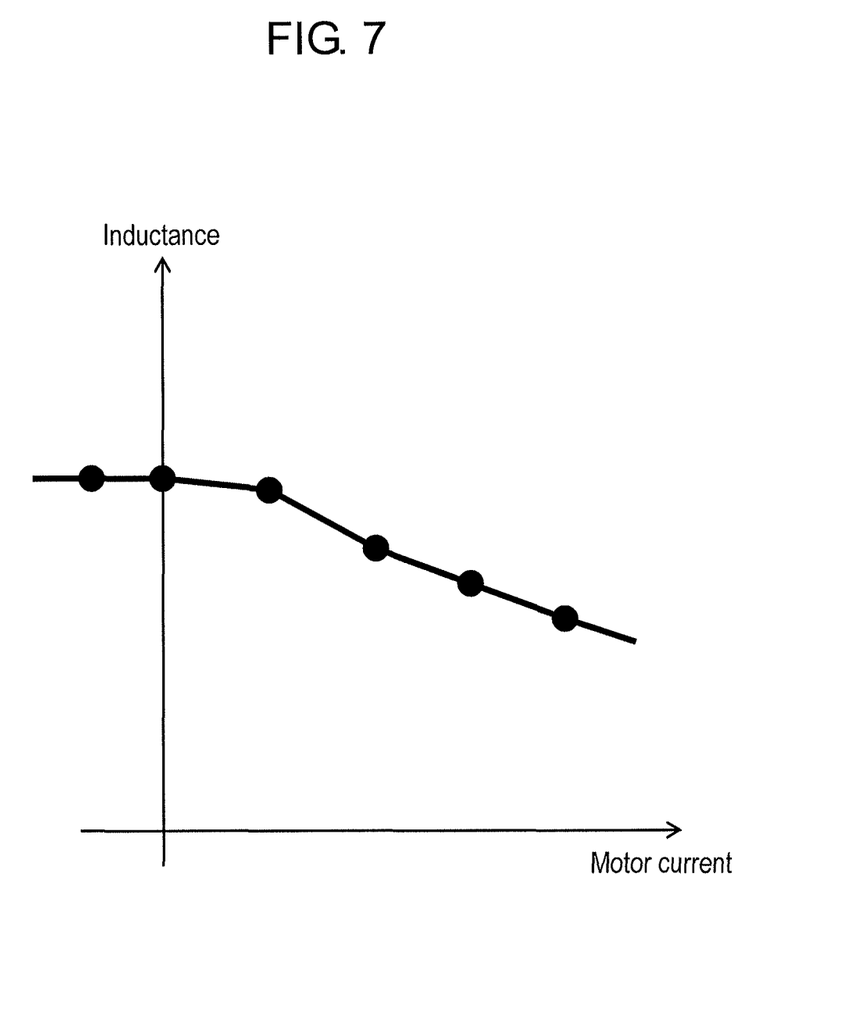
FIG. 7 is a graph illustrating the relationship between a motor current and an inductance.

FIG. 6 is a flowchart illustrating a processing flow in the second exemplary embodiment according to the present invention. In FIG. 6, the same processing as that described with reference to FIG. 2 is performed in steps S101 to S109. Here, in step S202, the voltage of the DC component V0 is changed per processing loop, that is, the voltage of the DC component also is varied, as described above. Moreover, in FIG. 6, step S207 is added to the processing described in the first exemplary embodiment with respect to FIG. 2.

In step S207, it is first confirmed whether or not all of a plurality of DC components are set in generating the voltage command Vs(t) in step S202. If there are DC components V0 that have not yet been set, one out of not-set values is selected, and then, the processing returns to step S202. In contrast, if all of the plurality of DC components are set, motor constant calculation comes to an end.

The plurality of DC components V0 is set, thus obtaining a plurality of relationships between the averages of detected motor currents and the calculated inductance values. The relationship illustrated in FIG. 7 is obtained with the resultant relationships, so that the inductance value according to the motor current can be calculated.

Incidentally, although the method for calculating a motor constant of the permanent magnet type synchronous motor is described in the first and second exemplary embodiments, any configurations and embodying means may be adopted as long as similar functions can be fulfilled. For example, the functional blocks other than a motor 12 in the block diagram of FIG. 1 may be incorporated as one function of a controller for a motor, and then, may be allowed to function by setting. Alternatively, a voltage command generator 11 and a motor constant calculator 16 may be configured as PC application software that is associated with a controller for a motor.

Moreover, although the applied voltage in the pulling-in processing (step S101) is set to Va, any different values may be used as long as it is pulled in.

Additionally, the motor constant is calculated with the applied voltage value and the motor current value when the difference in phase becomes 45 degrees. As illustrated in FIG. 5, the change in phase is the sharpest at the point where the difference in phase becomes 45 degrees. Therefore, since the frequency obtained in step S106 is not largely changed in the vicinity of 45 degrees, an applied voltage value and a motor current value nearly 45 degrees of the difference in phase may be used.

In addition, in the case where an element other than the motor such as filtering or a delay element is incorporated in the relationship of a response from the applied voltage Vs(t) to the motor current Is(t), the motor constant may be calculated with compensating the influence of such elements. As a consequence, a calculation result can be obtained with higher accuracy.

Furthermore, the rotor of the motor may be fixed after the puling-in processing (step S101), and then, voltage Vs(t) may be applied in step S103 in a direction in which electric phases are different with respect to a magnetic pole position after the puling-in processing, thereby detecting a motor current flowing in the direction. For example, 0 volt, Vs(t), and −Vs may be applied to the U phase, the V phase, and the W phase, respectively, such that a single phase voltage is applied to between axes (i.e., q axes) different in electric phase at 90° with respect to a magnetic pole position after the puling-in processing, that is, between V and W, so as to detect a V phase current in the direction. In this manner, in a permanent magnet type synchronous motor in which a motor constant depends upon a magnetic pole position, for example, a permanent magnet type synchronous motor of an embedded magnet type, the voltage Vs(t) is applied to any electric phases in step S103, so that the motor constant according to the magnetic pole position can be calculated with high accuracy. In particular, the voltage command Vs(t) is applied to the q axis so as to calculate the motor constant, thus calculating a q axis inductance.

Moreover, although the d axis inductance is obtained in the first and second exemplary embodiments, the calculated d axis inductance may be adopted as the q axis inductance in the case of the permanent magnet type synchronous motor in which the inductance value does not depend upon the magnetic pole position. As a consequence, the q axis inductance can be calculated without fixing the rotator.

As described above, the method for calculating a motor constant of the permanent magnet type synchronous motor according to the present invention includes: the voltage applying step of applying the voltage obtained by compositing the DC component and the AC component to the permanent magnet type synchronous motor with varying the frequency of the AC component; the current detecting step of detecting the motor current flowing according to the applied voltage; the phase difference calculating step of calculating the difference in phase between the AC component of the applied voltage and the AC component of the motor current; and the motor constant calculating step of calculating the motor constant of the permanent magnet type synchronous motor. And, in the motor constant calculating step, the motor constant is calculated based on the applied voltage and the motor current when the difference in phase becomes nearly 45 degrees. Moreover, the plurality of different DC components may be further used in the voltage applying step.

Additionally, the motor constant calculating device according to the present invention includes the functions of carrying out the steps in the method for calculating a motor constant.

The method for calculating a motor constant and the motor constant calculating device according to the present invention include the above-described steps, and consequently, the motor constant of the permanent magnet type synchronous motor can be accurately calculated in a short period of time.

INDUSTRIAL APPLICABILITY

The present invention enables the motor constant of the permanent magnet type synchronous motor to be accurately calculated in a short period of time, and therefore, is generally applicable to a controller for a permanent magnet type synchronous motor requiring the motor constant.

The invention claimed is:

1. A method for calculating a motor constant of a permanent magnet type synchronous motor, the method comprising:
    a voltage applying step of applying a voltage obtained by compositing a DC component and an AC component to the motor while varying a frequency of the AC component;
    a current detecting step of detecting a motor current flowing according to the applied voltage;
    a phase difference calculating step of calculating a difference in phase between the AC component of the applied voltage and an AC component of the motor current; and
    a motor constant calculating step of calculating a motor constant of the permanent magnet type synchronous motor,
    wherein the motor constant is calculated based on the applied voltage and the motor current when the difference in phase becomes nearly 45 degrees in the motor constant calculating step.

2. The method for calculating a motor constant of a permanent magnet type synchronous motor according to claim 1, wherein the voltage applying step comprises applying the applied voltage to the permanent magnet type synchronous motor while further varying a voltage of the DC component.

3. The method for calculating a motor constant of a permanent magnet type synchronous motor according to claim 2, wherein the motor constant calculating step includes calculating at least one of an electric time constant, a resistance value, and an inductance value as the motor constant of the permanent magnet type synchronous motor.

4. A motor constant calculating device comprising functions of, carrying out the steps in the method for calculating a motor constant of the permanent magnet type synchronous motor according to claim 2.

5. The method for calculating a motor constant of a permanent magnet type synchronous motor according to claim 1, wherein the motor constant calculating step includes calculating at least one of an electric time constant, a resistance value, and an inductance value as the motor constant of the permanent magnet type synchronous motor.

6. A motor constant calculating device comprising functions of carrying out the steps in the method for calculating a motor constant of the permanent magnet type synchronous motor according to claim 5.

7. A motor constant calculating device comprising functions of carrying out the steps in the method for calculating a motor constant of the permanent magnet type synchronous motor according to claim 1.

8. A motor constant calculating device comprising functions of carrying out the steps in the method for calculating a motor constant of the permanent magnet type synchronous motor according to claim 7.

\* \* \* \* \*